(12) United States Patent
Keegan et al.

(10) Patent No.: US 8,277,524 B2
(45) Date of Patent: Oct. 2, 2012

(54) REFORMER START-UP STRATEGY FOR USE IN A SOLID OXIDE FUEL CELL CONTROL SYSTEM

(75) Inventors: Kevin R. Keegan, Hilton, NY (US); Amanda M. Weiss, Livonia, NY (US); Charles R. DeJohn, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 2699 days.

(21) Appl. No.: 10/801,740

(22) Filed: Mar. 16, 2004

(65) Prior Publication Data

US 2005/0208664 A1    Sep. 22, 2005

(51) Int. Cl.
*H01M 8/04* (2006.01)

(52) U.S. Cl. .................. 48/197 R; 702/32; 429/429

(58) Field of Classification Search .................... 436/55; 431/8, 12, 18, 75, 326; 700/274
See application file for complete search history.

(56) References Cited

U.S. PATENT DOCUMENTS

| | | | | |
|---|---|---|---|---|
| 2,549,720 A | * | 4/1951 | Strassburger | 75/468 |
| 3,627,287 A | * | 12/1971 | Herz | 106/743 |
| 4,761,744 A | * | 8/1988 | Singh et al. | 700/274 |
| 5,401,162 A | * | 3/1995 | Bonne | 431/12 |
| 5,486,107 A | * | 1/1996 | Bonne | 431/121 |
| 6,095,793 A | * | 8/2000 | Greeb | 431/12 |
| 6,436,561 B1 | * | 8/2002 | Hart-Predmore et al. | 429/12 |
| 6,602,624 B1 | * | 8/2003 | Doan et al. | 429/13 |
| 6,796,129 B2 | * | 9/2004 | Yee et al. | 60/777 |
| 6,994,077 B2 | * | 2/2006 | Kobayashi et al. | 123/568.11 |
| 7,001,531 B2 | * | 2/2006 | Chen et al. | 252/71 |
| 2002/0031458 A1 | * | 3/2002 | Hirata | 422/189 |
| 2002/0071974 A1 | * | 6/2002 | Yamaoka et al. | 429/17 |
| 2002/0081470 A1 | * | 6/2002 | Hanai et al. | 429/20 |
| 2002/0150532 A1 | * | 10/2002 | Grieve et al. | 423/650 |
| 2002/0170504 A1 | * | 11/2002 | Kasahara et al. | 122/40 |
| 2003/0101713 A1 | * | 6/2003 | Dalla Betta et al. | 60/284 |
| 2004/0028964 A1 | * | 2/2004 | Smaling | 429/19 |
| 2004/0043343 A1 | * | 3/2004 | Kamijo | 431/2 |
| 2006/0005526 A1 | * | 1/2006 | Tanaka et al. | 60/39.27 |
| 2006/0123892 A1 | * | 6/2006 | Brekelmans et al. | 73/61.76 |

* cited by examiner

*Primary Examiner* — Imran Akram
(74) *Attorney, Agent, or Firm* — Thomas N. Twomey

(57) ABSTRACT

A method for determining an optimal combustion interval during start-up of a hydrocarbon catalytic reformer under various conditions of temperature, fuel type, and combustion fuel flow rate. An initial catalyst temperature is measured and an algorithm is used to calculate a rate of heating of the catalyst by combustion based upon heat content of the fuel, selected fuel flow rate, and heat capacity and mass of the catalyst and reformer passages. From the initial temperature and the heating gradient, an optimal combustion interval is inferred through the algorithm and used to terminate combustion, initiate a combustion quench interval, and change over the fuel flow rate and mixture from combustion to reforming.

19 Claims, 2 Drawing Sheets

REFORMER START-UP STRATEGY FOR USE IN A SOLID OXIDE FUEL CELL CONTROL SYSTEM

TECHNICAL FIELD

The present invention relates to methods for operating hydrocarbon catalytic reformers; more particularly, to reformer start-up control conditions; and most particularly, to a strategy and algorithm for calculating a reformer combustor burn time for heating the reformer catalyst to a minimum reforming temperature.

BACKGROUND OF THE INVENTION

Reformers for catalytically oxidizing hydrocarbons to produce hydrogen and carbon monoxide fuels are well known. Such reformers are used as fuel generators for downstream fuel cell systems in known fashion. Catalytic reforming requires an elevated catalyst temperature that at steady-state is typically between about 650° C. and 800° C. The reforming temperature then is maintained either by exothermic reforming or by endothermic reforming in the presence of hot exhaust recycled from the fuel cell system.

At start-up from an ambient temperature, the catalyst must be heated to a minimum temperature of about 500° C. before reforming can begin. One method for rapidly heating the catalyst is to combust oxygen and hydrocarbon fuel in an inline combustor ahead of the reformer and to pass the combustor exhaust through the reformer and then past the fuel cell anodes. In this practice, the combustor is operated optimally at a fuel-lean fuel:air ratio, whereas reforming is operated optimally at a very fuel-rich condition. Thus, it becomes of great importance to know when the catalyst surface reaches a temperature sufficient to support catalysis, in order to change over the mixture from combustion to reforming. If the changeover is too early, the catalyst temperature will be too low, and non-reformed hydrocarbons will be passed to the anodes, causing coking of the anodes and efficiency loss of the fuel cell system. If the changeover is too late, the reformer catalyst durability will be negatively impacted and the potential for pre-ignition in the reformer will be increased.

Obviously, a temperature probe at the catalyst surface could indicate when a suitable surface temperature has been reached. However, in practice such a location is not especially robust or practical and can also interfere with proper flow of gases through the reformer. Instead, a temperature probe typically is disposed within the ceramic elements of the reformer, which serves to protect the probe but also insulates it significantly, creating serious hysteresis between actual surface temperatures and measured temperatures during periods of rapid temperature change in the reformer.

One approach to dealing with this problem is to simply determine empirically how long it takes for the surface to reach the required minimum reforming temperature, and is then program the system controller to change the mixture after that time period. However, the length of time will depend upon the thermal state of the catalyst at start-up; the system may have been shut down only recently, in which case the reformer may still be quite warm, thus shortening the required combustion time. Indeed, if the reformer temperature is still sufficiently high to permit reforming, no combustion at all may be needed or desired. Also, the rate of heating will depend upon the latent combustive heat value of the fuel source being used, as well as the heat capacity and mass of the catalyst. Thus, neither a simple time instruction nor catalyst internal temperature measurement is adequate to determine when to change the entering mixture from combustion to reforming.

What is needed in the art is an improved means of estimating when to terminate combustion and change over to reforming.

It is a principal object of the present invention to change over a hydrocarbon reformer from combustion to reforming when the surface temperature of the catalyst exceeds a predetermined value.

SUMMARY OF THE INVENTION

Briefly described, a method in accordance with the invention is useful in determining an optimal combustion interval during start-up of a hydrocarbon catalytic reformer under various temperature conditions. An initial catalyst temperature is measured and an algorithm is used to calculate a temperature rise in the catalyst mass. From the initial temperature and the heating gradient, a combustion interval is calculated and used to terminate combustion, to initiate a combustion quench interval, and to change over the fuel flow rate from combustion to reforming.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
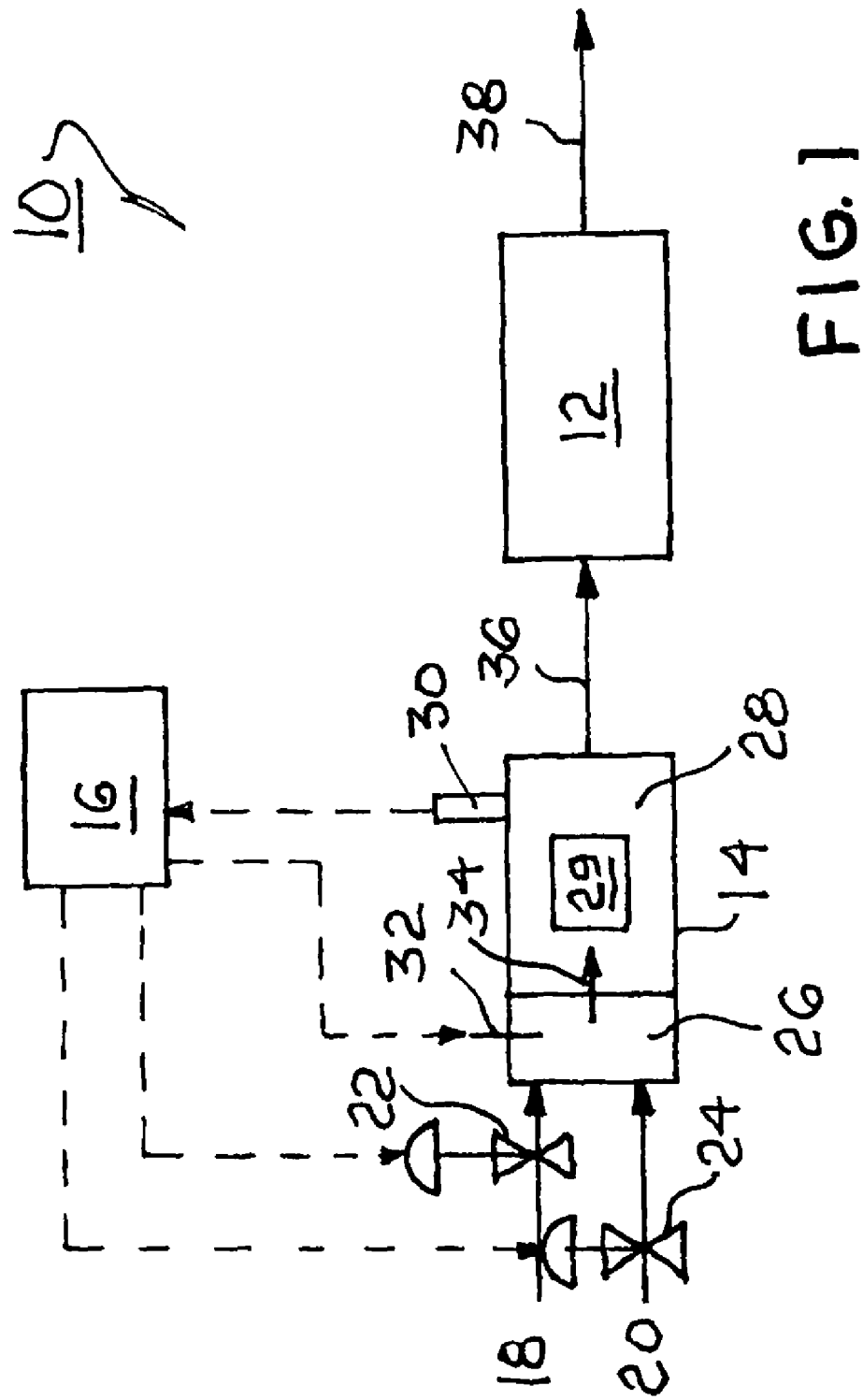
FIG. 1 is a simplified fuel cell system including a hydrocarbon reformer controlled in accordance with the invention.

Referring to FIG. 1, a simplified fuel cell apparatus 10 for generating electrical energy from catalytic combustion of hydrogen includes a fuel cell assembly 12, a catalytic hydrocarbon reformer 14, and an electronic control module 16 (ECM) for controlling the flow of hydrocarbon fuel 18 and air 20 into reformer 14 via respective control valves 22,24. Reformer 14 includes a combustion chamber 26, a reforming section 28 containing catalytic elements 29, and a temperature probe 30 that sends temperature signals to ECM 16. Combustion chamber 26 includes an igniter 32 controlled by ECM 16.

ECM 16 may include a computing environment operable to perform tasks or instructions in accordance with pre-programmed software constructs including algorithms, execution instructions or sequences, computations, software code modules, interface specifications or the like. It will be understood and appreciated that the functions performed by ECM 16 could be implemented in a computing environment such as a personal computer (PC) or other computing device. Such a computer may also include volatile and nonvolatile, removable and non-removable media implemented in any method or technology for storage of information such as program modules, data structures, computer readable instructions, or other data. Computer storage media may include, but is not limited to, Read Only Memory (ROM), Random Access Memory (RAM), flash memory, Electrically Erasable Programmable Read-Only Memory (EEPROM), or other types of memory, magnetic cassettes, magnetic tape, magnetic disk storage or other magnetic storage devices, CD-ROM, digital versatile disks (DVD) or other optical disk storage, or any other medium which can be used to store the desired information and which can be accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. It will be understood that combinations of any of the above should also be included within the scope of computer readable media.

In operation, ECM 16 receives a temperature signal from temperature probe 30 with respect to a general temperature condition with the catalyst in reforming section 28. As noted above, during intervals of changing temperatures within reformer 14, values from probe 30 lag instantaneous and actual temperature of the functional surfaces of catalytic elements 29. ECM 16 interrogates probe 30, and if the indicated temperature is below a predetermined value, for example, 500° C., at which reforming can take place in elements 29, ECM trims valves 22 and 24 to admit a predetermined flow of fuel 18 and air 20, at a predetermined ratio, into combustor 26. Admitted fuel and air are mixed in combustor 26 and are ignited by igniter 32, creating a hot exhaust that passes 34 into reforming section 28 where it heats elements 29. The spent exhaust passes further 36 into fuel cell assembly 12 and thence is discarded 38. In the prior art, when probe 30 indicates a predetermined temperature value, ECM 16 shuts off fuel flow through valve 22 and initiates a short quench interval to extinguish combustion in combustor 26, then adjusts valves 22 and 24 to provide a predetermined mixture ratio and flow rate suitable for reforming by catalytic elements 29.

Figure 2:
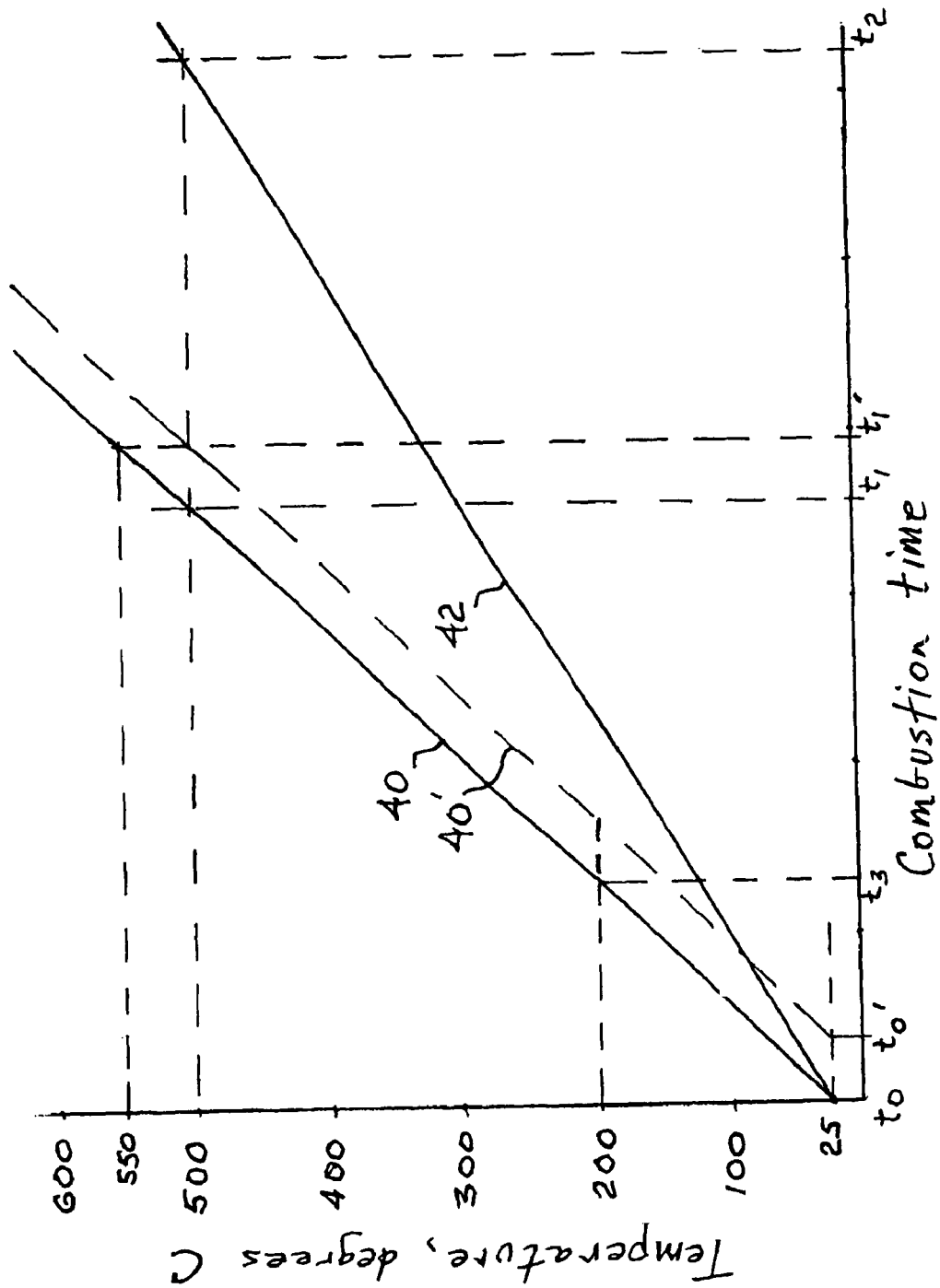
FIG. 2 is an idealized graph showing a typical heating curve in accordance with the invention.

Referring to FIG. 2, first and second heating curves 40,42 are shown for system 10 shown in FIG. 1, representing the time during which combustor 26 is in operation to heat elements 29 to a threshold temperature for reforming to commence. Curves 40,42 both begin at an actual ambient temperature of 25° C. on the surface of catalytic elements 29, and reach 500° C. at elapsed times $t_1$ and $t_2$, respectively. Although curves 40,42 may represent actual conditions on the same system 10, having identical catalyst heat capacities and thermal mass, heating is slower under curve 42 either because the combustion fuel flow is lower, or because the fuel is different and has a lower latent heat value, or both. Further, for curve 40, the elapsed time from $t_0$ to $t_1$ is a function of starting at 25° C. However, if the reformer is still warm from a previous use, for example, still at 200° C., the elapsed time for combustion is only $t_1$-$t_3$. Thus, in any start-up of system 10, it is imperative to known the thermal status of the reformer.

Referring still to FIG. 2, as noted above, because of the location of probe 30, a time lag exists between the actual temperature of elements 29 (curve 40) and the temperature response of probe 30 (curve 40'), corresponding to $t_0$'-$t_0$. Assuming that after this lag the response curve parallels the actual heating curve at any given moment, it is seen that the actual temperature is about 550° C. by the time that probe 30 reports 500° C., that is 50° C. higher and $t_1$'-$t_1$ later than necessary to begin reforming.

In accordance with the present invention, a linear algorithm of the form y=mx+b is provided for ECM 16 to estimate the slope of curve 40 at any given moment and thereby calculate when $t_1$ will occur:

$$T_P = T_I + \int [FLHV \times FF/(kC_{CAT} \times k_{MASS})]dt \quad \text{(Eq. 1)}$$

where $T_P$ equals the predicted temperature (y) at any time after $t_0$ equals the initial temperature $T_I$ (the intercept b) plus the integral of the fuel latent heat value FLHV times the fuel flow rate FF divided by the constant heat capacity of the catalyst $kC_{CAT}$ times the constant "important" mass $k_{MASS}$ of the catalyst and surroundings (the slope m), all times the change in time dt (x) from $t_0$. Note that, in operation, fuel flow rate FF is varied by control valve 22 as conditions require, as described above. Therefore, the calculated slope m ((FLHV× FF)/($kC_{CAT} \times k_{MASS}$)) will not be constant but instead will vary in relation to the varied flow rate FF. Note also that values for FLHV, $kC_{CAT}$, and $k_{MASS}$ can be readily established in a laboratory by one of ordinary skill in the art without undue experimentation, as can be the fuel flow FF delivery curve of valve 22.

The value of probe 30 in this invention is to establish $T_I$, assuming that when the system is started up at any given temperature the reformer is at thermal equilibrium and $T_I$ is in fact a close measure of the actual surface temperature of catalyst 29. Beyond that time, the algorithm substantially follows curve 40 rather than curve 40' to arrive at the desired reforming initiation temperature of 500° C. at time $t_1$.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for pre-heating a hydrocarbon catalytic reformer from a starting temperature to a minimum reforming temperature utilizing an electronic control module, comprising the steps of:
    a) selecting a fuel type to be combusted;
    b) determining the latent heat of combustion of said selected fuel type;
    c) selecting a flow rate of said combustion fuel;
    d) determining the heat capacity of a catalyst to be heated in said catalytic reformer;
    e) determining a mass of said reformer to be heated;
    f) determining said starting temperature of said catalyst in said catalytic reformer;
    g) utilizing a software construct to produce said fuel combustion time interval, wherein said construct utilizes said latent heat of combustion, said selected combustion fuel flow rate, said heat capacity of said catalyst, said mass to be heated, and said starting temperature; and
    h) pre-heating said hydrocarbon catalytic reformer using a combustor for said fuel combustion time interval so that said hydrocarbon catalytic reformer reaches said minimum reforming temperature.

2. A method in accordance with claim 1 wherein said software construct includes an algorithm, software code modules, or interface specifications.

3. A method in accordance with claim 1 wherein said software construct is an algorithm having the linear form y=mx+b.

4. A method in accordance with claim 3 wherein
    y is said minimum reforming temperature;
    b is said starting temperature;

m is an integral of a product of said latent heat of combustion times said selected flow rate of said combustion fuel, divided by a product of said mass to be heated times the heat capacity of said mass; and x is said fuel combustion time interval.

5. A method in accordance with claim 1 wherein said minimum reforming temperature is about 500° C.

6. A catalytic hydrocarbon reformer for making reformate, comprising:

an electronic control module for controlling the flow of hydrocarbon fuel and air into said reformer, wherein said electronic control module is programmed with a software construct for determining a fuel combustion time interval for pre-heating said hydrocarbon catalytic reformer to a minimum reforming temperature, wherein said fuel combustion time interval is at least dependent on a starting temperature of a catalyst in said reformer.

7. A catalytic hydrocarbon reformer in accordance with claim 6 wherein said software construct includes an algorithm, software code modules, or interface specifications.

8. A catalytic hydrocarbon reformer in accordance with claim 6 wherein said software construct is an algorithm having the linear form y=mx+b, and wherein y is said minimum reforming temperature;

b is said starting temperature;

m is an integral of a product of the latent heat of combustion of said fuel times the selected flow rate of said fuel, divided by a product of the mass of said reformer to be heated times the heat capacity of said mass; and x is said fuel combustion time interval.

9. A catalytic hydrocarbon reformer in accordance with claim 6 wherein said fuel cell assembly includes a solid oxide fuel cell.

10. A computing system having a processor, a memory and an operating environment operable to execute a method for determining a fuel combustion time interval for pre-heating a hydrocarbon catalytic reformer from a starting temperature to a minimum reforming temperature, the method comprising:

a) selecting a fuel type to be combusted;
b) determining the latent heat of combustion of said selected fuel type;
c) selecting a flow rate of said combustion fuel;
d) determining the heat capacity of a catalyst to be heated in said catalytic reformer;
e) determining a mass of said reformer to be heated;
f) determining said starting temperature of said catalyst in said catalytic reformer; and
g) utilizing a software construct to produce said fuel combustion time interval, wherein said construct utilizes said latent heat of combustion, said selected combustion fuel flow rate, said heat capacity of said catalyst, said mass to be heated, and said starting temperature.

11. A computing system in accordance with claim 10 wherein said software construct includes an algorithm, software code modules or interface specifications.

12. A computing system in accordance with claim 10 wherein said software construct is an algorithm having the linear form y=mx+b.

13. A computing system in accordance with claim 12 wherein y is said minimum reforming temperature;

b is said starting temperature;

m is an integral of a product of said latent heat of combustion times said selected flow rate of said combustion fuel, divided by a product of said mass to be heated times the heat capacity of said mass; and x is said fuel combustion time interval.

14. A computing system in accordance with claim 10 wherein said minimum reforming temperature is about 500° C.

15. A computer readable medium having computer executable instructions of a wired media type for performing a method for determining a fuel combustion time interval for pre-heating a hydrocarbon catalytic reformer from a starting temperature to a minimum reforming temperature, comprising the steps of:

a) selecting a fuel type to be combusted;
b) determining the latent heat of combustion of said selected fuel type;
c) selecting a flow rate of said combustion fuel;
d) determining the heat capacity of a catalyst to be heated in said catalytic reformer;
e) determining a mass of said reformer to be heated;
f) determining said starting temperature of said catalyst in said catalytic reformer; and
g) utilizing a software construct to produce said fuel combustion time interval, wherein said construct utilizes said latent heat of combustion, said selected combustion fuel flow rate, said heat capacity of said catalyst, said mass to be heated, and said starting temperature.

16. A computer readable medium in accordance with claim 15 wherein said software construct includes an algorithm, software code modules or interface specifications.

17. A computer readable medium in accordance with claim 15 wherein said software construct is an algorithm of the linear form y=mx+b.

18. A computer readable medium in accordance with claim 17 wherein y is said minimum reforming temperature;

b is said starting temperature;

m is an integral of the product of said latent heat of combustion times said selected flow rate of said combustion fuel, divided by a product of said mass to be heated times the heat capacity of said mass; and x is said fuel combustion time interval.

19. A computer readable medium in accordance with claim 15 wherein said minimum reforming temperature is about 500° C.

* * * * *